(12) United States Patent
Schinski (10) Patent No.: US 6,497,812 B1
(45) Date of Patent: Dec. 24, 2002

(54) CONVERSION OF $C_1$–$C_3$ ALKANES AND FISCHER-TROPSCH PRODUCTS TO NORMAL ALPHA OLEFINS AND OTHER LIQUID HYDROCARBONS

(75) Inventor: William L. Schinski, San Rafael, CA (US)

(73) Assignee: Chevron U.S.A. Inc., San Francisco, CA (US)

( * ) Notice: Subject to any disclaimer, the term of this patent is extended or adjusted under 35 U.S.C. 154(b) by 76 days.

(21) Appl. No.: 09/649,767

(22) Filed: Aug. 28, 2000

Related U.S. Application Data (60) Provisional application No. 60/171,735, filed on Dec. 22, 1999.

(51) Int. Cl.⁷ ............................................... C10G 69/14
(52) U.S. Cl. ......................... 208/131; 208/78; 208/80; 208/313; 208/950; 585/304; 585/648; 585/820; 585/829; 518/702
(58) Field of Search ............................ 208/131, 78, 80, 208/313, 950; 585/304, 648, 820, 829; 518/702

(56) References Cited

U.S. PATENT DOCUMENTS

| | | | |
|---|---|---|---|
| 2,678,263 A | 5/1954 | Glazier .......................... 44/80 |
| 2,852,546 A | 9/1958 | Kolling et al. .............. 260/450 |
| 3,402,122 A | 9/1968 | Atwater et al. |
| 3,402,217 A | * 9/1968 | Engelbrecht et al. .......... 208/2 |
| 4,041,097 A | 8/1977 | Ireland et al. |
| 4,042,488 A | 8/1977 | Perciful |
| 4,111,793 A | * 9/1978 | Kolombos et al. .......... 208/121 |
| 4,133,841 A | 1/1979 | Cosyns et al. .......... 260/676 R |
| 4,159,937 A | 7/1979 | Scott |
| 4,401,556 A | 8/1983 | Bezman et al. |
| 4,522,939 A | 6/1985 | Minderhoud et al. |
| 4,579,986 A | 4/1986 | Sie |
| 4,594,172 A | 6/1986 | Sie |
| 4,820,402 A | 4/1989 | Partridge et al. |
| 4,906,671 A | 3/1990 | Haag et al. |
| 4,913,799 A | 4/1990 | Gortsema et al. |
| 4,943,672 A | 7/1990 | Hamner et al. |
| 5,059,567 A | 10/1991 | Linsten et al. |
| 5,073,530 A | 12/1991 | Bezman et al. |
| 5,114,563 A | 5/1992 | Lok et al. |
| 5,146,022 A | 9/1992 | Buchanan et al. |
| 5,149,516 A | 9/1992 | Han et al. |
| 5,198,203 A | 3/1993 | Kresge et al. |
| 5,246,689 A | 9/1993 | Beck et al. |
| 5,324,335 A | 6/1994 | Benham et al. |
| 5,334,368 A | 8/1994 | Beck et al. |
| 5,345,019 A | 9/1994 | Bigeard et al. |
| 5,348,982 A | 9/1994 | Herbolzheimer et al. |
| 5,371,308 A | 12/1994 | Gosselink et al. |
| 5,378,348 A | 1/1995 | Davis et al. |
| 5,656,150 A | 8/1997 | Reed et al. |
| 5,763,716 A | * 6/1998 | Benham et al. ............. 518/702 |
| 5,866,745 A | 2/1999 | Gartside et al. |

FOREIGN PATENT DOCUMENTS

| | | | |
|---|---|---|---|
| EP | 0 161 705 | 11/1985 | |
| EP | 0 583 836 | 2/1994 | |
| EP | 0 668 342 | 8/1995 | |
| GB | 2158090 A | * 11/1985 | |
| WO | 99/37737 | 7/1999 | ........... C10G/73/42 |

OTHER PUBLICATIONS

S.T. Sie, et al. Conversion of Natural Gas to Transportation Fuels via The Shell Middle Distillate Synthesis Process, *Catalyst Today*, vol. 8 (1991) pp. 371–394.

B. Jager, Developments in Fischer–Tropsch Technology, *Studies in Surface Science and Catalysis*, vol. 107 (1997) pp. 219–224.

P. Chaumette, Gas to Liquid Conversion—Basic Features and Competitors, *Petrole et Techniques*, No. 415 (Jul.–Aug. 1998) pp. 83–85.

Ramachandran et al., Bubble Column Slurry Reactor, Three–Phase Catalytic Reactors Chapter 10, pp. 308–332 Gordon and Broch Science Publishers (1983).

* cited by examiner

*Primary Examiner*—Walter D. Griffin (57) ABSTRACT

Processes for converting $C_1$ to $C_3$ alkanes into high purity $C_6$ to $C_{24}$ normal alpha olefins and internal combustion engine grade fuels and/or lubricating oils comprising a sequence of fractionation and thermal cracking and/or hydrocracking operations. The $C_6$ to $C_{24}$ normal alpha olefin fractions generally have a purity of at least about 90 wt. %.

19 Claims, 1 Drawing Sheet

CONVERSION OF $C_1$–$C_3$ ALKANES AND FISCHER-TROPSCH PRODUCTS TO NORMAL ALPHA OLEFINS AND OTHER LIQUID HYDROCARBONS

This Application claims the benefit of No. 60/171,735 filed Dec. 22, 1999.

BACKGROUND OF THE INVENTION

The invention relates to a method for converting Fischer-Tropsch type reaction products rich in $C_{16}$–$C_{50}$ linear paraffins into high purity $C_6$–$C_{24}$ normal alpha olefins ("NAOs") having a purity of at least about 90 wt. %. This invention also relates to the conversion of $C_1$–$C_3$ alkane rich gases to more useful liquid hydrocarbons. In a further aspect it relates to the conversion of natural gas discharged in the recovery of crude oil, commonly referred to as flare gas, and excess $C_1$–$C_3$ alkanes produced as byproducts in various refinery operations, into more useful liquid hydrocarbon products such as normal alpha olefins, lubricating oil and liquid fuels. (The term liquid refers to hydrocarbons which are liquid at ambient conditions, including however, pentane.)

In the recovery of crude oil a large amount of natural gas (methane) is frequently encountered. In the past, depending on the location of the oil field, the value of the natural gas was frequently not considered to be worth the cost of recovery and transportation. Accordingly, in many cases, the natural gas which was generated was simply burned off. As well as being wasteful this practice is no longer considered acceptable from an environmental standpoint and in many cases prohibited by governmental regulations. A similar problem may also exist with respect to excess $C_1$–$C_3$ alkanes produced during petroleum refining operations or other chemical manufacturing operations to the extent it exceeds the fuel requirements of the facility. Thus, a need to convert natural gas or methane ethane and propane to more valuable products has been recognized for a number of years. Efforts have been undertaken since before World War II to convert methane to synthesis gas and synthesis gas ($CO+H_2$) into more desirable liquid products and are still continuing today Typically these processes involve the use of the Fischer-Tropsch process, in which a less valuable material, e.g. coal or methane, is first converted to synthesis gas by incomplete oxidation and the synthesis gas converted to liquid or solid hydrocarbon products, e.g., paraffins, olefins and oxygenates. The Fischer-Tropsch products may in turn be upgraded to more useful products by a variety of operations. For example, U.S. Pat. Nos. 5,345,019 and 5,378,348 disclose a process for hydrocracking paraffins produced by a Fischer-Tropsch to produce kerosene, gas oil, and base oil. U.S. Pat. No. 4,943,672 discloses a process for producing lubricating oil from Fischer-Tropsch waxes by hydroisomerization. U.S. Pat. No. 4,579,986 is directed to a process for making $C_{10}$–$C_{20}$ linear olefins which comprises thermal cracking, in the presence of steam, $C_{20+}$ paraffins obtained by a Fischer-Tropsch process using certain Fischer-Tropsch catalysts containing cobalt and zirconium, titanium and/or chromium. The patent also teaches that in addition to being useful as a feed for the preparation of linear $C_{10}$–$C_{20}$ olefins, the $C_{20+}$ fraction is useful for obtaining solid paraffins, lower olefins (primarily ethene), high VI lubricating oil and middle distillates (Col. 4, lines 55–68) and that the $C_{19}$-fraction may be used to prepare lower olefins, high VI synthetic lubricants, solvents and specialty oils (Col. 5, lines 1–23). U.S. Pat. No. 4,594,172 discloses a process for preparing high VI synthetic lubricants and U.S. Pat. No. 5,371,308 discloses a process for preparing lower olefins from a hydroprocessed synthetic oil fraction such as may be obtained from a Fischer-Tropsch synthesis. The general thermal cracking of petroleum waxes to produce normal alpha olefins is described in U.S. Pat. No. 4,042,488 and in The Oil and Gas Journal, pages 102–104, Dec. 13, 1965.

Many improvements have also been made in the basic Fischer-Tropsch process since its origins in the 1923, such that even though the Fischer-Tropsch process still produces a wide range of molecular weight products, the selectivity of the process may be directed between lighter paraffin and heavier paraffins (e.g. $C_{20+}$ waxes) by adjusting reaction conditions and/or using different catalyst; see for example U.S. Pat. Nos. 4,041,097; 4,522,939; 4,579,986; and 5,378,348 and S. T. Sie, et al. Conversion of Natural Gas to Transportation Fuels via The Shell Middle Distillate Synthesis Process, *Catalyst Today*, Vol. 8 (1991) pp. 371–394 B. Jager, Developments in Fischer-Tropsch Technology, *Studies in Surface Science and Catalysis*, Vol. 107 (1997) pp. 219–224, and P. Chaumette, Gas to Liquid Conversion—Basic Features and Competitors, *Petrole et Techniques*, No. 415 (July–August 1998) pp. 83–85.

One of the problems with thermal cracking, at least where high purity normal alpha olefins are desired, is that the purity of the product is generally relatively poor because of the presence of dienes and branched olefins. Thus in the past ethylene oligomerization has bee used where high purity normal alpha olefins are desired. Therefore, it would be desirable to develop a process embodying thermal cracking which produces a high purity normal olefin product. Further, although much work has ben done with respect to Fischer-Tropsch processes and upgrading the products therefrom, it would be desirable to develop improved processes for converting Fischer-Tropsch reaction products into more valuable products especially in locations where the transportation costs associated with methane or other hydrocarbon gases are economically unattractive.

SUMMARY OF THE INVENTION

The present invention provides an efficient process for upgrading Fischer-Tropsch reaction products and for converting natural gas and other gases containing large amounts of methane ethane or propane or mixtures thereof into normal alpha olefins or other liquid hydrocarbon products particularly normal alpha olefins. The invention further provides a process embodying thermal cracking which produces a high purity $C_6$–$C_{24}$ normal alpha olefin product at least equal or better than that produced using the more expensive ethylene oligomerization processes. The $C_6$–$C_{24}$ normal alpha olefin products provided by the present invention contain at least 90 wt. % and preferably at least 95 wt. % $C_6$–$C_{24}$ normal alpha olefins. Further by using more rigorous separation processes purities of at least 98 wt. % approaching 100% can be obtained.

In one embodiment the present invention provides a process for upgrading Fischer-Tropsch products or product fractions comprising at least about 90 wt. % $C_{16}$–$C_{50}$ linear paraffins into high purity $C_6$–$C_{24}$ normal alpha olefin products which comprises the steps of:

a) thermal cracking the 90 wt. % $C_{16}$–$C_{50}$ linear paraffin mixture in the presence of steam at a mole ratio of steam to said mixture of at least about 5:1, under thermal cracking conditions adjusted to produce a cracking conversion of said mixture of about 30% or less thereby yielding a reaction product mixture comprising a fraction boiling within the $C_6$–$C_{24}$ normal alpha olefin boiling range, recomprising at least 90 wt. % $C_6$–$C_{24}$ normal alpha olefins.

b) fractionating the reaction product mixture of step a) into separate fractions comprising at least one normal alpha olefin product fraction comprising normal alpha olefins selected within the range of 6 to 24 carbon atoms in which said fraction has a normal alpha olefin purity of at least about 90 wt. % and a higher boiling fraction boiling above about 740° F. (393° C.) comprising higher boiling olefins and paraffins;

In another embodiment of the above process, full boiling range Fischer-Tropsch products are separated into a fuel fraction boiling below and about 540° F. (282° C.) a wax fraction boiling between about 540° F. to 1100° F. (593° C.) containing at least about 90 wt. % linear paraffin and a high boiling fraction boiling from above about 1100° F. (593° C.). The wax fraction is thermal cracked as described above and one or more of the other fractions are hydrocracked to more valuable liquid hydrocarbon products. Similarly, the higher boiling fraction from step b) above may also be upgraded by hydrocracking.

The present invention also provides a process for converting $C_1$–$C_3$ alkane gases, e.g. natural gas, into more valuable products such as higher molecular weight liquid fuels and normal alpha olefins (NAO) which comprises the steps of:

a) reforming said $C_1$–$C_3$ alkanes into synthesis gas for example, by steam reforming, partial oxidation or catalytic oxidation;

b) contacting the synthesis gas with a Fischer-Tropsch catalyst under reactive conditions to yield two hydrocarbon product streams, one a wax containing product stream boiling above about 540° F. (282° C.) comprising $C_{16}$–$C_{50}$ linear paraffins, and a second product boiling below about 540° F., comprising hydrocarbons boiling in the vacuum gas oil and liquid fuel ranges (e.g., paraffins, oxygenates and middle distillate, gasoline) and tail gases;

c) distilling the wax containing product of step b) into fractions comprising a linear $C_{16}$–$C_{50}$ paraffin fraction boiling in about the range of 540° F. (282° C.) to 1100° F. (593° C.) containing at least about 90 wt. % linear $C_{16}$–$C_{50}$ paraffins, a liquid fuel fraction boiling below about 540° F. (282° C.) and a heavy fraction boiling above about 1100° F. (593° C.);

d) thermal cracking the linear $C_{16}$–$C_{50}$ paraffin fraction of step c) in the presence of steam at a steam to said $C_{16}$–$C_{50}$ paraffin fraction mole ratio of at least about 5:1 under thermal cracking conditions adjusted to produce a conversion no greater than about 30 wt. % to produce a reaction product mixture comprising a substantial amount of $C_6$–$C_{24}$ NAOs without the formation of significant amounts of dienes;

e) fractionating the reaction product of step d) into NAO product fractions of varying chain length within the range of $C_6$–$C_{24}$ having a NAO content of at least 90 wt. % and a higher boiling fraction boiling above about 1100° F. (593° C.) containing branched olefin, paraffins and NAO's having more than 24 carbon atoms;

f) hydrocracking the liquid fuel portion of the second product of step b); the vacuum gas oil fraction of step c) and the higher boiling fraction recovered in step e) with hydrogen in a hydrocracker in the presence of a hydrocracking catalyst under hydrocracking conditions to produce a mixture comprising gasoline and middle distillate; and g) fractionating the reaction product of step f) and recovering at least one liquid fuel fraction, and at least one higher boiling hydrocarbon fraction and recycling at least one of said higher boiling hydrocarbon fractions back to said hydrocracker.

In another embodiment the invention provides a process for upgrading a substantially full boiling range Fischer-Tropsch reaction product including tail gases through bright stock boiling range hydrocarbons, which process comprises the steps of:

a) fractionating said Fischer-Tropsch reaction product into separate fractions comprising a fraction boiling in the liquid fuel boiling range, a wax fraction boiling in about the range of about 540° F. to 1100° F. comprising at least 90 wt. % $C_{16}$ to $C_{50}$ linear paraffins and a high boiling fraction boiling above about 1100° F.;

b) thermal cracking the wax fraction of step a) in the presence of steam at a mole ratio of steam to said wax fraction of at least 5:1, under reactive conditions adjusted to produce a conversion based on said wax fraction no greater than 30 wt. % to yield a reaction product mixture containing a substantial amount of $C_6$–$C_{24}$ normal alpha olefins without the fomation of significant amounts of $C_6$ to $C_{24}$ dienes;

c) fractionating the reaction product of step b) into separate fractions comprising at least one normal alpha olefin product fraction comprising a normal alpha olefin fraction selected within the range of 6 to 24 carbon atoms having a $C_6$–$C_{24}$ normal alpha olefin purity of at least 90 wt. % and a higher boiling fraction comprising higher boiling olefins and paraffins;

d) hydrocracking said higher boiling fraction of step c), and the liquid fuel fraction of step a) with hydrogen in a hydrocracker in the presence of a catalyst comprising a hydrogenation component and an acid catalyst cracking component, under hydrocracking conditions to produce a liquid reaction product mixture comprising liquid fuel boiling hydrocarbons; and e) fractionating the liquid reaction product mixture of step d) into separate fractions comprising a liquid fuel fraction, and at least one higher boiling hydrocarbon fraction and recycling at least one of said higher boiling fraction back to said hydrocracker.

In another embodiment the invention provides a process comprising the steps of:

a) converting $C_1$–$C_3$ alkanes into synthesis gas for example, by steam reforming, partial oxidation or catalytic oxidation;

b) contacting the synthesis gas with a Fischer-Tropsch catalyst under reactive conditions to yield a reaction product mixture of hydrocarbons comprising linear $C_{16}$–$C_{50}$ paraffins, vacuum gas oil, middle distillate, gasoline light oxygenates and light olefins;

c) fractionating the Fischer-Tropsch reaction product mixture of step b) into separate fractions comprising a linear $C_{16}$–$C_{50}$ paraffin fraction containing at least about 90 wt. % linear $C_{16}$–$C_{50}$ paraffin, at least one liquid fuel fraction and at least one higher boiling fraction boiling above the temperature of the $C_{16}$–$C_{50}$ rich fraction;

d) thermal cracking the linear $C_{16}$–$C_{50}$ paraffin fraction of step c) in the presence of steam at a mole ratio of steam under reactive conditions adjusted to produce a conversion based on said linear $C_{16}$–$C_{50}$ paraffin fraction of about 30 wt. % producing a mixture of NAO's of varying chain length as a substantial product without the formation of significant amounts $C_6$–$C_{24}$ dienes;

e) fractionating the reaction product of step d) into NAO product fractions of varying chain length within the range of six to twenty-four carbon atoms having an NAO purity of at least 90 wt. % and a higher boiling fraction containing NAO's having more than 24 carbon atoms and branched olefins and paraffins;

f) hydrocracking at least one of the liquid fuel fraction and higher boiling fractions recovered in step c) and the higher boiling fraction recovered in step e) with hydrogen in the presence of a hydrocracking catalyst under hydrocracking conditions to produce a reaction product comprising liquid fuel hydrocarbons; and g) fractionating the reaction product of step f) and recovering at least one liquid fuel fraction and at least one higher boiling hydrocarbon fraction and recycling at least one higher boiling hydrocarbon fraction back to said hydrocracker.

Additional aspects of the invention will be apparent from the description which follows:

FURTHER DESCRIPTION OF THE INVENTION

The present invention provides an efficient process for upgrading Fischer-Tropsch reaction products and for converting natural gas and other gases containing large amount of methane, ethane or propane or mixtures thereof into normal alpha olefins or other liquid hydrocarbon products. In general the major component of these gases is methane. The invention is especially applicable to remote sites which produce a surplus of natural gas or other $C_1$–$C_3$ alkanes gases, but which are too remote from markets for these gases to justify the cost of transporting the $C_1$–$C_3$ alkanes. The invention also provides process flexibility to adjust between waxes, normal α-olefins, liquid fuel products and lube oil base stocks depending on the relative market demand for the products and provide a thermal cracking process which produces a high purity $C_6$–$C_{24}$ normal alpha olefin product without significant amounts of dienes and branched olefins; typically less than about 10 wt. % and preferably less than about 5 wt. %. As used herein, liquid fuel refers to hydrocarbon fractions boiling with the gasoline range and/or middle distillate range, (e.g., diesel fuel and jet fuel). Thus, for example, the term liquid fuel fraction refers to a gasoline fraction, a diesel fuel fraction, a jet fuel fraction or a fraction including both gasoline and middle distillate.

Starting with the $C_1$–$C_3$ alkanes gases the alkanes are reformed to a mixture of hydrogen and carbon monoxide. Reforming is well known in the art, and includes a variety of technologies including steam reforming, partial oxidation, dry reforming, series reforming, convective reforming, and autothermal reforming. All have in common the production of syngas from methane and other light hydrocarbons, and an oxidant (steam, oxygen, carbon dioxide, air, enriched air or combinations thereof). The effluent typically contains some carbon dioxide and steam in addition to syngas and unreacted feed gases. Series reforming, convective reforming and autothermal reforming incorporate exothermic and endothermic syngas forming reactions in order to better utilize the heat generated in the process. These processes for producing synthesis gas or syngas from $C_1$–$C_3$ alkanes are well known to the art. Steam reforming is typically effected by contacting $C_1$–$C_3$ alkanes with steam, preferably in the presence of a reforming catalyst, at a temperature in the range of about 1300° F. (705° C.) to about 1675° F. (913° C.) and pressures from about 10 psia (0.7 bars) to about 500 psia (34 bars). Suitable reforming catalysts which can be used include, for example, nickel, palladium, nickel-palladium alloys, and the like. Additional information regarding steam reforming $C_1$–$C_3$ alkanes, e.g., methane, to syngas can be found in U.S. Pat. No. 5,324,335 hereby incorporated by reference in its entirety.

Partial oxidation of $C_1$–$C_3$ alkanes to syngas is also conducted at high temperature and while the partial oxidation may be conducted without a catalyst it is more effectively conducted in the presence of a catalyst. In general Group VIII metals can be used as the catalyst typically supported on a mineral oxide or synthetic support, e.g., alumina. Typically, the partial oxidation is conducted at temperatures in about the range of 1500° F. (815° C.) to about 2000° F. (1093° C.) pressures in about the range from atmospheric to 3000 psia (1 to 20.4 bars). Space velocities can vary over a very wide range and typical range of 100 to 100,000 $hr^{-1}$ and even higher depending on the particular catalyst used and the type of reactor. A discussion of nickel silica alumina and nickel/magnesium oxide and cobalt/magnesium oxide and other oxidation catalysts may be found in A. Santos et al., Oxidation of Methane to Synthesis Gas in Fluidized Bed Reactor using MgO-Based Catalysts, Journal of Catalysis, Vol. 158 (1996) pp. 81–91 hereby incorporated by reference in its entirety.

The partial oxidation may also be conducted using a peroskite catalyst partial oxidation process such as described in U.S. Pat. No. 5,149,516 hereby incorporated by reference in its entirety. Peroskites are materials having essentially the same crystal structure as the mineral peroskite (Ca Ti O3) without limitation as to the elemental constituents thereof. Such materials can be represented by the formula XYO3 wherein X and Y can be variety of elements. For example, X can be La, Ca, Sr, Ba, Na, K, Ag, Cd and mixtures thereof and Y can be Ta, Co, Ti, Ga, Nb, Fe, Ni, Mn, Gr, V, Th, Pb, Sn, Mo, Zn and mixtures thereof. Partial oxidation reactions using a peroskite catalyst are typically conducted at temperatures in the range of about from 600 to 900° C., pressures of about from 0.1 to 100 bar and gas hourly space velocities of from 100 to 300,000 $hr^{-1}$. (These space velocities are determined using a gas volume based on NTP conditions, i.e. room temperature (about 25° C.) and one atmosphere of pressure.) The mole ratio of lower alkane can vary from 1:1 to 100:1 moles of alkane to oxygen. Regardless of the system used to produce syngas it is desirable to remove any sulfur compounds, e.g., hydrogen sulfide and mercaptans, contained in the $C_1$–$C_3$ alkane feed. This can be effected by passing the $C_1$–$C_3$ alkanes gas through a packed bed sulfur scrubber containing zinc oxide bed or another slightly basic packing material. If the amount of $C_1$–$C_3$ alkanes exceeds the capacity of the synthesis gas unit the surplus $C_1$–$C_3$ alkanes can be used to provide energy throughout the facility. For example, excess $C_1$–$C_3$ alkanes may be burned in a steam boiler to provide the steam used in the thermal cracking step of the present process.

The syngas product is converted to liquid hydrocarbons by contact with a Fischer-Tropsch catalyst under reactive conditions. Depending on the quality of the syngas it may be desirable to purify the syngas prior to the Fischer-Tropsch reactor to remove carbon dioxide produced during the syngas reaction and any sulfur compounds, if they have not already been removed. This can be accomplished by contacting the syngas with a mildly alkaline solution (e.g. aqueous potassium carbonate) in a packed column. In general Fischer-Tropsch catalysts contain a Group VIII transition metal on a metal oxide support. The catalyst may also contain a noble metal promoter(s) and/or crystalline molecular sieves. Pragmatically, the two transition metals which are most commonly used in commercial Fischer-Tropsch processes are cobalt or iron. Ruthenium is also an effective Fischer-Tropsch catalyst but is more expensive than cobalt or iron. Where a noble metal is used, platinum and palladium are generally preferred. Suitable metal oxide supports or matrices which can be used include alumina, titania, silica, magnesium oxide, silica-alumina, and the like and mixtures thereof.

Although, Fischer-Tropsch processes produce a hydrocarbon product having a wide range of molecular sizes the selectivity of the process toward a given molecular size range as the primary product can be controlled to some extent by the particular catalyst used. In the present process, it is preferred to produce linear $C_{16}$–$C_{50}$ paraffins as the primary product, and therefore, it is preferred to use a cobalt catalyst, although iron catalysts may also be used. Also, by hydrotreating the product other linear hydrocarbon products, e.g. oxygenates and olefins, can be converted to the corresponding linear paraffins.

One suitable Fischer-Tropsch catalyst which can be used is described in U.S. Pat No. 4,579,986 as satisfying the relationship.

$$(3+4R) > L/S > (0.3+0.4R),$$

wherein

L=the total quantity of cobalt present on the catalyst, expressed as mg Co/ml catalyst, S=the surface area of the catalyst, expressed as $m^2$/ml catalyst, and R=the weight ratio of the quantity of cobalt deposited on the catalyst by kneading to the total quantity of cobalt present on the catalyst.

Preferably, the catalyst contains about 3–60 ppw cobalt, 0.1–100 ppw of at least one of zirconium, titanium or chromium per 100 ppw of silica, alumina, or silica-alumina and mixtures thereof. Typically, the synthesis gas will contain hydrogen, carbon monoxide and carbon dioxide in a relative mole ratio of about from 0.25 to 2 moles of carbon monoxide and 0.01 to 0.05 moles of carbon dioxide per mole of hydrogen. In the present process we prefer to use a mole ratio of carbon monoxide to hydrogen of about 0.4 to 1, more preferably 0.5 to 0.7 moles of carbon monoxide per mole of hydrogen with only minimal amounts of carbon dioxide; preferably less than 0.5 mole percent carbon dioxide.

In the present process the Fischer-Tropsch reaction is typically conducted at temperatures of about from 300 to 700° F. (149 to 371° C.) preferably 400 to 500° F. (204 to 228° C.); pressures of about from 10 to 500 psia (0.7 to 34 bar), preferably 30 to 300 psia (2 to 21 bar), and catalyst space velocities of about from 100 to 10,000 cc/g/hr, preferably 300 to 3,000 cc/g/hr. The reaction can be conducted in any suitable reactor, for example, fixed bed reactors containing one or more catalyst beds, or slurry reactors, and/or fluidized bed reactor.

The Fischer-Tropsch reaction product can be separated into the desired product fractions e.g. a gasoline fraction (B.P. about 68–450° F.) a middle distillate fraction (B.P. about 450–540° F.) a wax fraction (B.P. about 540–1100° F.) primarily containing $C_{16}$ to $C_{50}$ normal paraffins with a small amount of branched paraffins and a heavy fraction (B.P. above about 1100° F.). If higher normal alpha olefins product are desired or more middle distillate is desired a higher wax fraction can be recovered $C_{20}$–$C_{50}$ normal paraffins (BP about 650–1100° F.) and a middle distillate fraction BP about 450–650° F. Further, using a higher linear paraffin cut, e.g. $C_{26}$–$C_{50}$ will facilitate the removal of uncracked linear paraffins from the desired $C_6$–$C_{24}$ NAO product of the thermal cracking step, discussed below. With the exception of the wax fraction, the other fractions are largely a matter of choice depending on the products desired and the particular plant configuration; for example, a single liquid fuel fraction may be taken off comprising both gasoline and middle distillate may be taken off and multiple heavy cuts may be taken off. In some cases tail gases will be exhausted from the reactor separate from the $C_5$ and higher hydrocarbons. The tail gas, primarily containing hydrogen and $C_1$ to $C_4$ paraffins, can be used as fuel gas or can be treated to remove carbon dioxide and used as a hydrogen or alkane recycle stream.

In a preferred embodiment, the Fischer-Tropsch reaction is conducted in a bubble column slurry reactor. In this type of reactor synthesis gas is bubbled through a slurry comprising catalyst particles in a suspending liquid. Typically the catalyst has a particle size of about from 10–110 microns, preferably about from 20–80 microns, more preferably about from 25–65 micron and a density of about from 0.25 to 0.9 g/cc preferably about from 0.3–0.75 g/cc. The catalyst typically comprises one of the aforementioned catalytic metals, preferably cobalt on one of the aforementioned catalyst supports. Preferably the catalyst comprises about 10 to 14 wt. % cobalt on a low density fluid support, for example alumina, silica and the like having a density within the ranges set forth above for the catalyst. Since, the catalyst metal may be present in the catalyst as oxides the catalyst is typically reduced with hydrogen prior to contact with the slurry liquid. The starting slurry liquid is typically a heavy hydrocarbon having a viscosity high enough to keep the catalyst particles suspended, typically a viscosity between 4–100 centistokes at 100° C.) and a low enough volatility to avoid vaporization during operation, typically an initial boiling point range of about from 350 to 550° C. The slurry liquid is preferably essentially free of contaminants such as sulfur, phosphorous or chlorine compounds. Thus initially, it may be desirable to use a synthetic hydrocarbon fluid such as a synthetic olefin oligomer as the slurry fluid. Ultimately, a paraffin fraction of the product having the desired viscosity and volatility is typically recycled as the slurry liquid. The slurry typically has a catalyst concentration of about 2–40 wt. % catalyst, preferably 5–20 wt. % and more preferably 7–15 wt. % catalyst based on the total weight of the catalyst, i.e. metal plus support. The syngas feed typically has hydrogen to carbon monoxide mole ratio of about from 0.5 to 4 moles of hydrogen per mole of carbon monoxide preferably about from 1 to 2.5 and more preferably about 1.5 to 2.

The bubble slurry reactor is typically operated at temperatures within the range of 150–300° C., preferably 185 to 265° C. and more preferably 210–230° C. and pressures within the range of 1 to 70 bar, preferably 6–35 bar and most preferably 10 to 30 bar (1 bar=14.5 psia). Typical synthesis gas linear velocity ranges in the reactor from about 2 to 40 cm per sec. preferably 6 to 10 cm per sec. Additional details regarding bubble column slurry reactors can, for example, be found in Y. T. Shah et al., Design Parameters Estimations for Bubble Column Reactors, AIChE Journal, 28 No. 3 pp. 353–379 (May 1982); Ramachandran et al., Bubble Column Slurry Reactor, Three-Phase Catalytic Reactors Chapter 10, pp. 308–332 Gordon and Broch Science Publishers (1983); Deckwer et al., Modeling the Fischer-Tropsch Synthesis in the Slurry Phase, Ind. Eng. Chem. Process Des. Dev. v 21, No. 2, pp. 231–241 (1982); Kölbel et al., The Fischer-Tropsch Synthesis in the Liquid Phase, Catal. Rev.-Sci. Eng., v. 21(n), pp. 225–274 (1980) and U.S. Pat No. 5,348, 982, all of which are hereby incorporated by reference in their entirety.

The gaseous reaction product from the Fischer-Tropsch bubble slurry reactor comprises hydrocarbons boiling below about 540° F. (e.g., tail gases through middle distillates). The liquid reaction product is recovered as or with the slurry and comprises hydrocarbons boiling above about 540° F., e.g., vacuum gas oil through heavy paraffins. The minus 540° F. product can be separated into a tail gas fraction and a condensate fraction, i.e., about $C_5$ to $C_{16}$ normal paraffins and higher boiling hydrocarbons, using a high pressure and/or lower temperature vapor-liquid separator or low pressure separators or a combination of separators. The tail gas fraction may be used as described above. The condensate fraction can be fractionated into the desired product fraction; e.g. gasoline, light middle distillate or more preferably can be upgraded by hydrocracking. The F-T fraction boiling above about 540° F., is typically separated into a wax fraction boiling in the range of about 540° F.–1100° F. primarily containing $C_{16}$ to $C_{50}$ linear paraffins with relatively small amounts of higher boiling branched paraffins, one or more liquid fuel fractions boiling below about 540° F. and one or more fractions boiling above about 1100° F. Typically, the separation is effected by fractional distillation. Alternatively, if the Fischer-Tropsch reaction is designed to produce a single process stream, then the entire product stream may be fractionated, generally after first removing hydrogen and preferably other tail gases. This can be done by passing the product stream through one or more vapor-liquid separators prior to fractionation.

Because the Fischer-Tropsch product typically contains linear oxygenates and olefins boiling in the same range as the desired linear paraffins, either the F-T liquid reaction product or the fraction boiling within the $C_{16}$ to $C_{50}$ linear paraffin range is preferably hydrotreated to convert the oxygenates and olefins to paraffins. Thus, improving the yield of the desired linear paraffins. Hydrotreating is well known to the art and can be effected using any suitable hydrotreating procedure. Typically, hydrotreating is conducted at temperatures in about the range of 650 to 800° F. (427° C.) and pressures in about the range of 800 to 3000 psi (54 to 204 atms) in the presence of a catalyst comprising at least one Group VIII or Group VI metal and more typically containing one metal from each group, e.g. colbalt-molybdenum; nickel-tungsten, on a neutral mineral oxide support such as alumina and the like, at LHSVs in the range of about from 0.25 to 2 $hr^{-1}$. Typically, the liquid hydrocarbon feed is contacted with hydrogen at a ratio of at least 50 SCF of hydrogen per Bbl of feed and preferably between about 1,000 to 5,000 SCF/Bbl.

The $C_{16}$ to $C_{50}$ paraffin fraction, or if desired a $C_{20}$ to $C_{50}$ or $C_{26}$ to $C_{50}$ fraction, is thermally cracked into smaller chain length normal alpha olefins, e.g. $C_6$ to $C_{24}$. The thermal cracking can be conducted over a wide range of temperatures and pressures but is typically conducted at temperatures in the range of about from 950° F. (510° C.) to 1900° F. (1038° C.) preferably 1000 to 1600° F. (538 to 871° C.) and pressures of about from 0.5 to 10 bars (7 to 147 psia) preferably about from 1 to 5 bar (14.5 to 73.5 psia). Residence times or space velocity will vary with the reactor temperatures and pressures. Typical residence times may vary from about 0.1 to 2 seconds where high temperatures, e.g. above about 1300° F. (704° C.) are used, to space velocities (LHSV) of about from 0.3 to 20 $hr^{-1}$ with lower temperatures. The reaction may be conducted by passing the feed through a packed bed of inert material or by using tube reactors or other types of reactors. Generally a catalyst is not used. The thermal cracking is conducted in the presence of steam. The steam serves as a heat source for the endothermic reactions and also as a diluent to isolate ethylene free radicals and suppress undesired side reactions and coke formation. The severity of the thermal cracking conditions will vary with the carbon chain length or molecular weight distribution of the feedstock and the carbon chain length distribution desired in the reaction product and the desired cracking conversion. Details of a typical steam thermal cracking process be found in U.S. Pat No. 4,042,488, hereby incorporated by reference its in entirety.

One of the problems with producing normal alpha olefins by paraffin thermal cracking is that a significant amount of undesired dienes, which are not easily separated from the desired normal alpha olefins, are also produced. However, in accordance with the present invention, by using a high purity linear paraffin feed steam, at least 90 wt. % linear paraffins, and keeping the conversion low and preferably using a high steam to feed mole ratio the amount of dienes produced can be very substantially reduced thus permitting recovery of a high purity $C_6$ to $C_{24}$ normal alpha olefin product fraction. The desired normal alpha olefin is separated from the reaction product (e.g. fractional distillation) to remove unreacted starting material as well as any higher boiling branched olefins and dienes. In practicing the present invention the cracking conversion should be no greater than 30% based on weight of feed and preferably no greater than 25 wt. %. In general best results in terms of yield of high purity $C_{16}$–$C_{24}$ normal alpha olefins is obtained by controlling the conversion within the range of 15 to 25 wt. %. This can be accomplished by adjusting the reaction temperatures, pressures and residence time (space velocity) within the ranges set forth above. Optimum reaction conditions will also vary somewhat with the particular feedstock and can be determined by routine process optimization. Typically mole ratios of steam to hydrocarbon feed in about the range of from 2:1 to 7:1 preferably about from 3:1 to 5:1 and more preferably about 5:1 moles of steam per mole of hydrocarbon feed can be used.

Because some higher dienes boiling in the $C_{16}$–$C_{50}$ normal paraffin boiling range will be produced, even though small, it is preferred not to recycle the $C_{16}$–$C_{50}$ paraffin fraction of the reaction product range back to the thermal cracking reactor. This is preferable to risking ultimately increasing the diene content of the $C_6$–$C_{24}$ normal alpha olefin fraction product. although a carefully monitored and controlled single recycle may be acceptable. Further information regarding general thermal cracking can be had by reference to U.S. Pat Nos. 5,146,022; 5,656,150; and 5,866, 745 hereby incorporated by reference in their entirety.

The reaction product from the thermal reactor is typically fed to a fractional distillation column, although other suitable separation procedures could also be used, to separate the product into normal alpha olefins of the desired chain length range and to remove higher boiling paraffins and branched olefins and any lower boiling material. The $C_6$–$C_{24}$ normal alpha olefin fraction has a normal alpha olefin content of at least about 90 wt. % preferably at least about 95% wt. %. Further by using more rigorous purification techniques such as extractive distillation and/or adsorption, normal alpha olefin contents in excess of 95 wt.

% up to about 99 wt. % and approaching 100% can be obained. The normal alpha olefin fractions either with or without further treatment are used as chemical intermediates for a variety of products, including lubricants and surfactants.

The higher boiling paraffins and olefins fraction, e.g. above about $C_{24}$, from the thermal reaction product fractionator, the condensate, the liquid fuel fractions and the 1100° F.+ fractions are preferably upgraded by hydrocracking. This may be effected by hydrocracking the respective products individually or by combining one or more of the fractions. Preferably, fractions having similar boiling point ranges are combined to optimize hydrocracking conditions. For example, the condensate fraction from the minus 700° F. Fischer-Tropsch product is preferably combined with the vacuum gas oil ("VGO") boiling range fraction, and hydrocracked to higher quality liquid products. The hydrocracking operation can be conducted as a block operation wherein the hydrocracker is alternated between liquid fuel fractions and heavier fuel fractions or parallel hydrocrackers can be used each processing a different distillation range feedstock. Hydrocracking can be effected by contacting the particular fraction or combination of fractions, with hydrogen in the presence of a suitable hydrocracking catalyst at temperatures in the range of about from 600 to 900° F. (316 to 482° C.) preferably 650 to 850° F. (343 to 454° C.) and pressures in the range about from 200 to 4000 psia (13–272 atm) preferably 500 to 3000 psia (34–204 atm) using space velocities based on the hydrocarbon feedstock of about 0.1 to 10 hr$^{-1}$ preferably 0.25 to 5 hr$^{-1}$. Generally, more severe conditions within these ranges will be used with higher boiling feedstocks and depending on whether gasoline, middle distillate or lubricating oil is desired as the primary economic product. The hydrocracking step reduces the size of the hydrocarbon molecules, hydrogenates olefin bonds, hydrogenates aromatics, and removes traces of heteroatoms resulting in an improvement in fuel or base oil product quality.

As is well known the hydrocracking catalysts contain a hydrogenation component and a cracking component. The hydrogenation component is typically a metal or combination of metals selected from Group VIII noble and non-noble metals and Group VIB metals. The noble metals, particularly platinum or palladium, are generally more active but are expensive. Non-noble metals which can be used include molybdenum, tungsten, nickel, cobalt, etc. Where non-noble metals are used it is generally preferred to use a combination of metals, typically at least one Group VIII metal and one Group VIB metal, e.g., nickel-molybdenum, cobalt-molybdenum, nickel-tungsten, and cobalt-tungsten. The non-noble metal hydrogenation metal are usually present in the final catalyst composition as oxides, or more preferably, as sulfides when such compounds are readily formed from the particular metal involved. Preferred non-noble metal overall catalyst compositions contain in excess of about 5 weight percent, preferably about 5 to about 40 weight percent molybdenum and/or tungsten, and at least about 0.5, and generally about 1 to about 15 weight percent of nickel and/or cobalt determined as the corresponding oxides. The sulfide form of these metals is most preferred due to higher activity, selectivity and activity retention.

The hydrogenation components can be incorporated into the overall catalyst composition by any one of numerous procedures. They can be added either to the cracking component or the support or a combination of both. In the alternative, the Group VIII components can be added to the cracking component or matrix component by co-mulling, impregnation, or ion exchange and the Group VI components, i.e.; molybdenum and tungsten can be combined with the refractory oxide by impregnation, co-mulling or co-precipitation. Although these components can be combined with the catalyst support as the sulfides, that is generally not the case. They are usually added as a metal salt which can be thermally converted to the corresponding oxide in an oxidizing atmosphere or reduced to the metal with hydrogen or other reducing agent. The non-nobel metal composition can then be sulfided by reaction with a sulfur donor such as carbon bisulfide, hydrogen sulfide, hydrocarbon thiols, elemental sulfur, and the like.

The cracking component is an acid catalyst material and may be a material such as amorphous silica-alumina or may be a zeolitic or non-zeolitic crystalline molecular sieve. Examples of suitable hydrocracking molecular sieves include zeolite Y, zeolite X and the so called ultra stable zeolite Y and high structural silica:alumina ratio zeolite Y such as for example described in U.S. Pat. Nos. 4,401,556, 4,820,402 and 5,059,567. Small crystal size zeolite Y, such as described in U.S. Pat. No. 5,073,530 can also be used. The disclosures of all of which patents are hereby incorporated by reference in their entirety. Non-zeolitic molecular sieves which can be used include, for example silicoaluminophosphates (SAPO), ferroaluminophosphate, titanium aluminophosphate and the various ELAPO molecular sieves described in U.S. Pat. No. 4,913,799 and the references cited therein. Details regarding the preparation of various non-zeolite molecular sieves can be found in U.S. Pat. No. 5,114,563 (SAPO); U.S. Pat. No. 4,913,799 and the various references cited in U.S. Pat. No. 4,913,799, hereby incorporated by reference in their entirety. Mesoporous molecular sieves can also be included, for example the M41S family of materials (J. Am. Chem. Soc. 1992, 114, 10834–10843), MCM-41 (U.S. Pat. Nos. 5,246,689, 5,198,203, 5,334,368), and MCM-48 (Kresge et al., Nature 359 (1992) 710.)

In general amorphous silica-alumina is more selective for middle distillates, e.g., diesel fuel, whereas crystalline molecular sieves are much more active and produce greater amounts of lighter products, e.g., gasoline. The so-called high (structural) silica-alumina ratio ($Si_2O_3:Al_2O_3$=about 50) Y zeolites are less active than the conventional zeolite Y but, are more selective for middle distillate and more active than amorphous silica-alumina. The catalyst also typically contains a matrix or binder material resistant to the conditions used in the hydrocracking reaction. Suitable matrix materials include synthetic or natural substances as well as inorganic materials such as clay, silica and/or metal oxides. The latter may be either naturally occurring or in the form of gelatinous precipitates or gels including mixtures of silica and metal oxides naturally occurring clays which can be composited with the catalyst include those of the montmorillonite and kaolin families. These clays can be used in the raw state as originally mined or initially subjected to calumniation, acid treatment or chemical modification.

The catalyst may be composited with a porous matrix material, such as alumina, silica-alumina, silica-magnesia, silica-zirconia, silica-thoria, silica-berylia, silica-titania as well as ternary compositions, such as silica-alumina-thoria, silica-alumina-zirconia, silica-alumina-magnesia, and silica-magnesia zirconia. The relative proportions of molecular sieve component and inorganic oxide matrix or binder may vary widely with the molecular sieve content ranging from between 1 to 99, more usually 5 to 80, percent by weight of the composite. The matrix may itself possess catalytic properties generally of an acidic nature, such as for example where amorphous silica-alumina is used as a matrix or binder for a molecular sieve. In general it is preferred to use a non-zeolite or low acidic zeolite catalyst, e.g., high structural silica:alumina ratio Y zeolite, as the catalyst where middle distillates is desired as the main commercial product and an acidic zeolite catalyst, e.g., conventional or ultra stabilized Y zeolite, where gasoline is desired as the main commercial product.

Furthermore more than one catalyst type may be used in the reactor. The different catalyst types can be separated into layers or mixed.

The hydrocrackate is then separated into various boiling range fractions. The separation is typically conducted by fractional distillation preceded by one or more vapor-liquid separators to remove hydrogen and/or other tail gases. The fractions separated will typically include a gasoline fraction and a high boiling bottom fraction and one or more intermediate boiling range fractions. The high boiling fraction is preferably recycled back to the hydrocracker. The light tail gas fraction, i.e., methane, ethane, proposal and any residual hydrogen is withdrawn and can be for fuel gases or for hydrogen recovery which in turn can be recycled back to the hydrocracker. Typical, liquid/vapor separator systems which can be used to remove tail gases and hydrogen are, for example, described in U.S. Pat. Nos. 3,402,122 and 4,159,937 hereby incorporated by reference in their entirety.

If desired the feed may be hydrotreated prior to hydrocracking to remove impurities and heterorganics, e.g. oxygenates. Hydrotreating may be conducted in a separate reactor preceding the hydrocracking or may be conducted in the same reactor, for example, as one or more hydrotreating catalyst beds preceding one or more hydrocracking catalyst beds. The hydrotreating bed may also serve as a screen to remove any particulate matter in the feedstock or may itself be preceded with guard beds of crushed rock or other suitable material. Hydrotreating can be effected by the same general procedure as described above with respect to hydrotreating of the Fischer-Tropsch reaction product.

Although the invention is described herein in terms of a Fischer-Tropsch reaction or process the invention also applies to the various modifications of the literal Fischer-Tropsch process by which hydrogen (or water) and carbon monoxide (or carbon dioxide) are converted to hydrocarbons (e.g. paraffins, ethers etc.) and to the products of such processes. Thus the term Fischer-Tropsch type process or product is intended to apply to Fischer-Tropsch processes and products and the various modifications thereof and the products thereof. For example, the term is intended to apply to the Kolbel-Engelhardt process typically described by the reactions The present process can also be applied to upgrade Fischer-Tropsch products generally by applying the steps discussed above following the Fischer-Tropsch reaction to Fischer-Tropsch type products. Where such Fischer-Tropsch type products do not contain at least about 90 wt. % linerar $C_{16}$ to $C_{50}$ paraffins the Fischer-Tropsch type product may be concentrated or purified by any suitable procedure, typically fractional distillation, to produce a fraction having the desired $C_{16}$ to $C_{50}$ linear paraffin concentration, preferably such Fischer-Tropsch type products, or at least the liquid portion thereof, should contain at least 20 wt. % linear $C_{20}$ to $C_{50}$ paraffins and more preferably should contain between 30–80 wt. % $C_{20}$ to $C_{50}$ paraffins for optimum benefit in the case of the fully integrated process. The Fischer-Tropsch type product preferably contains less than about 10 wt. % oxygenates, more preferably less than 5 wt. %.

Figure 1:
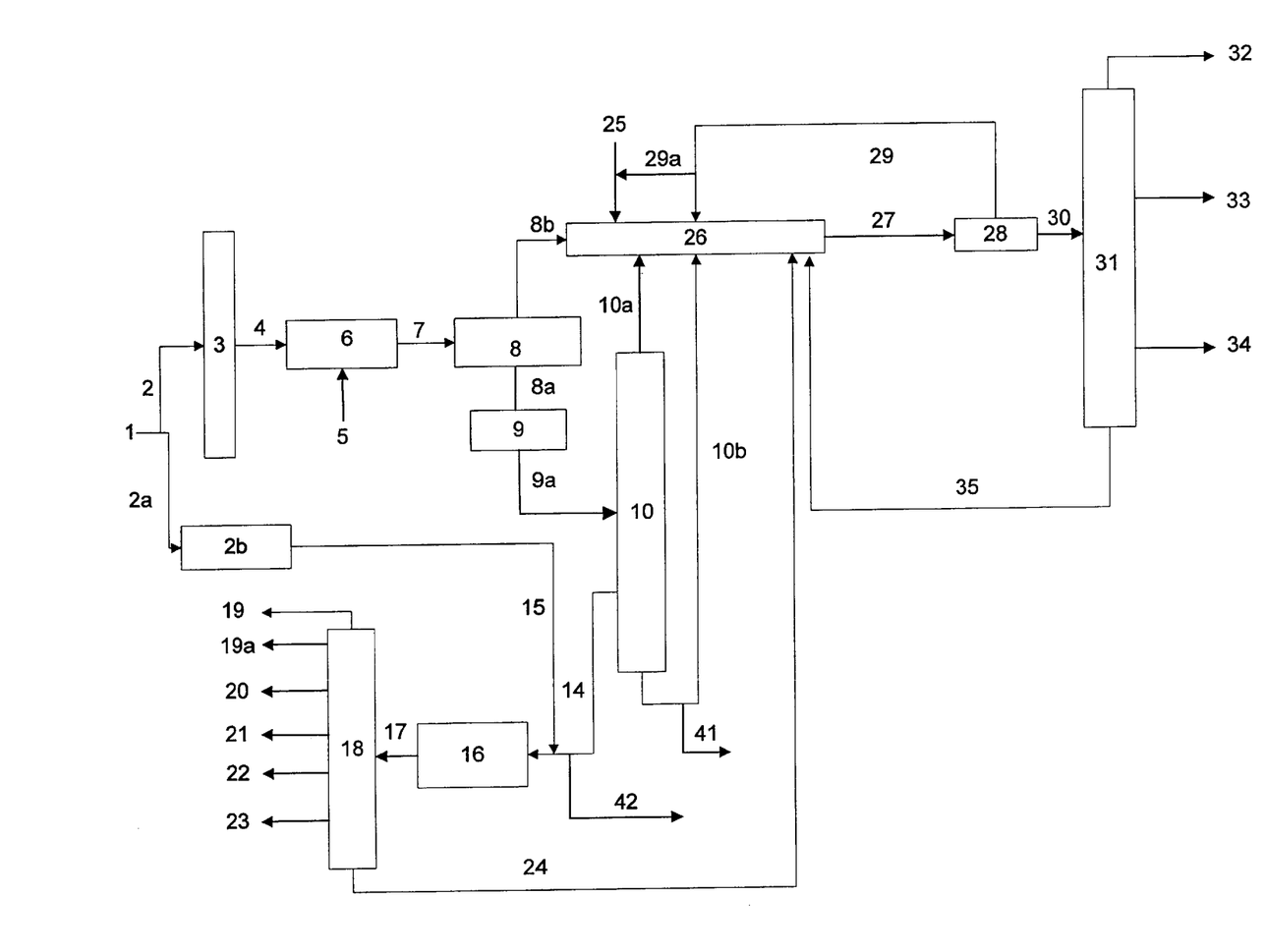
The drawing is a schematic flow sheet of a preferred embodiment of the invention in which two different boiling range products are recovered from the Fischer-Tropsch reaction and upgraded.

For the purposes of further understanding of the invention an embodiment of the invention will now be described with reference to the drawing.

EXAMPLE 1

Referring to the Figure, an embodiment of the invention will be described using a bubble slurry Fischer-Tropsch reactor. Natural gas 1, is fed by line 2 to scrubber 3 containing a packed bed of zinc oxide to remove any hydrogen sulfide or mercaptan gases contained in the natural gas. A portion of the natural gas is split off via line 2a to provide fuel for boiler 2b. The sulfur free natural gas, is fed via line 4 to syngas reactor 6 where it is reacted with oxygen provided by oxygen line 5 to effect partial oxidation of the methane. Fixed bed reactor 6 contains a packed bed of peroskite $LaCoO_3$ catalyst and is operated at a temperature of about 720° C. and a pressure of about 1 bar (atmospheric pressure) and a space velocity of about 27,400 $hr^{-1}$ to produce a syngas containing about 2 mol of hydrogen per mole of carbon monoxide. If needed the mol ratio of hydrogen to carbon monoxide may be adjusted by passing the syngas through a membrane separator (not shown). The syngas reaction product having a mole ratio of hydrogen to carbon monoxide of 2 is fed via line 7 to Fischer-Tropsch bubble column slurry reactor 8 containing a 12 wt. % cobalt on low density alumina catalyst having a particle size of about 25 to 65 microns and a density of about 0.4 to 7 g/cc in a 8 cs, at 100° C., synfluid slurry liquid. Prior to mixing with the slurry liquid the catalyst is reduced by contact with a 5 vol. % hydrogen, 95 vol. % nitrogen gas at about 200–250° C. for about 12 hours and then increasing the temperature to about 350–400° C. and maintaining this temperature for about 24 hours while slowly increasing the hydrogen content of the gas until the reducing gas is essentially 100% hydrogen. Reactor 8 is operated at a temperature of about from 210 to 230° C., a pressure of 25–30 bar and a syntheis gas linear velocity of about 6 to 10 cm/sec to produce a liquid hydrocarbon product containing a high proportion of $C_{20}$ to $C_{50}$ paraffins (the wax product) discharged via line 8a and a light product boiling below about 650° F. (343° C.) containing middle distillate and tail gases discharged via line 8b. Tail gases are removed from the light fraction, for example by using one or more liquid/gas separators, not shown, operating at lower temperatures and/or pressures and the remaining light product stream (condensate) comprising $C_5$ and higher hydrocarbons boiling below 650° F. (343° C.) is fed to hydrocracker 26. The F-T wax product is fed via line 8a to hydrotreater 9 operated at about 700° F. (371° C.) to 750° F. (399° C.) and a pressure of about 60–65 atms and a LHSV of about 1 $hr^{-1}$ over a nickel-tungsten on alumina catalyst. The hydrotreated product is fed via line 9a to fractional distillation column 10 where it is fractionated into a wax fraction boiling above about 700° F. (371° C.) primarily containing at least 90 wt. % $C_{20}$–$C_{50}$ linear paraffins, a high boiling bright stock fraction boiling above about 1100° F. and a liquid fuel fraction boiling below about 700° F. The wax fraction is fed via line 14 to thermal cracking reactor 16. Prior to entering the reactor the high boiling fraction feed is combined with steam furnished by line 15 from boiler 2b at a mole ratio of about 5 mol of steam per mole of the wax fraction feed. The thermal cracking reaction is initially conducted in reactor 16 at a temperature of about 1050° F. (566° C.) to 1150° F. (621° C.), a pressure of about 15 psia and a space velocity of 2 $hr^{-1}$ and then adjusted to produce a conversion of about 25%. The reaction product from thermal cracker 16 is fed via line 17 to fractional distillation column 18 where it is fractionated into four normal alpha olefin fractions of varying carbon chain length and correspondingly boiling points. Thus, the lower boiling $C_6$–$C_9$ normal alpha olefins are taken off as product fractions via line 19a, $C_9$–$C_{11}$ normal alpha olefins via line 20, $C_{11}$–$C_{14}$ normal alpha olefins via line 21, $C_{15}$ to $C_{19}$ normal alpha olefins via line 22 and finally the higher boiling $C_{20}$–$C_{24}$ normal alpha olefins via line 23. In accordance with the invention, the $C_6$–$C_{24}$ normal alpha olefin streams will have a purity of at least about 90 wt. %. Hydrocarbon gases having five carbon atoms or less are discharged via line 19 and may be used as a fuel to supply energy to other plant operations. The bottoms fraction comprising uncracked material and larger chain length olefins, and higher boiling branched olefins and paraffins is fed to hydrocracker 26 via line 24 instead of being recycled back to thermal cracker 16. This avoids build up of dienes and branched olefins in the reactor and correspondingly produces a purier normal alpha-olefin product because the higher boiling dienes and branched olefins are not cracked into lower boiling dienes and branched olefins which would be taken off with the $C_6$–$C_{24}$ normal alpha olefin product fractions. Instead the high boiling fraction containing higher boiling dienes, branched olefins and paraffins and uncracked paraffins are hydrocracked into more valuable products such as gasoline and middle distillates.

Referring to distillation column 10, the liquid fraction is taken off and fed hydrocracker 26 via line 10a. The bright stock fraction boiling above about 1100° F. (593° C.), is fed via line 10b to hydrocracker 26 or more preferably at least a portion of the bright stock fraction is taken off via line 13 for processing as a heavy lube stock. Similarly a portion of the of the $C_{20}$–$C_{50}$ paraffin fraction from column 10 may be taken off via line 42 for neutral lube oil processing. (Lube oil processing involves separate hydrocracking not shown and optional hydrofinishing not shown). Hydrogen is fed to the hydrocracker 26 via line 25.

Hydrocracker 26 is a fixed bed reactor containing a nickel-tungsten silica-alumina catalyst and is operated at a temperature of from 650 to 850° F., a pressure of 500 to 3500 psia and a catalyst space velocity of 0.1 hr$^{-1}$ to 10 hr$^{-1}$. The reaction product from the hydrocracker is fed via line 27 to a series of vapor-liquid separators, shown in the drawing as a single box 28, to remove hydrogen from the reaction product. The hydrogen recovered from separator 28 is combined with fresh make up hydrogen 25 and recycled back to the hydrocracker via lines 29 or alternatively fed directly to hydrocracker 26. The liquid hydrocrackate from the vapor liquid separators 28 is fed via line 30 to fractional distillation column 31 where it is fractionated into a fuel fraction and a lube oil fraction and taken off via lines 33 and 34 respectively. Lower boiling hydrocarbons and any residual hydrogen is taken off via line 32 tail gases and used as an energy source for other plant operations. The bottom fraction containing uncracked feed and other higher hydrocarbons is recycled back to the hydrocracker via line 35.

Obviously many modifications and variations of the invention described herein can be made without departing from the essence and scope thereof.

What is claimed is:

1. A process for upgrading Fischer-Tropsch reaction products comprising a first hydrocarbon reaction product boiling above about 540° F. (282° C.) comprising $C_{16}$–$C_{50}$ paraffins, liquid fuel hydrocarbons and oxygenates and a second reaction product boiling below about 540° F. (282° C.) comprising tail gases, paraffins, olefins and oxygenates which process comprises the steps of:

a) fractionating said first hydrocarbon reaction product into separate fractions comprising a fraction boiling in the liquid fuel boiling range, a wax fraction boiling in about the range of about 540° F.–1100° F. comprising at least about 90 wt. % $C_{16}$–$C_{50}$ linear paraffins, and a fraction boiling above about 1100° F.;

b) thermal cracking the wax fraction of step a) in the presence of steam at a mole ratio of steam to said wax fraction of about 3:1 to 5:1, under reaction condition adjusted to provide a conversion no greater than about 30 wt. % of said wax fraction thereby yielding a reaction product mixture containing normal alpha olefins of varying chain length within the range of $C_6$–$C_{24}$, and wherein the fraction of said reaction product mixture boiling within the $C_6$ to $C_{24}$ normal alpha olefin boiling range contains at least 90 wt. % $C_6$ to $C_{24}$ normal alpha olefins;

c) fractionating the reaction product of step b) into separate fractions comprising at least one normal alpha olefin product fraction comprising normal alpha olefins selected within the range of 6 to 24 carbon atoms and a higher boiling fraction boiling above about 730° F. (388° C.) comprising higher boiling olefins and paraffins;

d) separating said second Fischer-Tropsch reaction product into a tail gas fraction and a condensate fraction boiling below about 540° F. comprising $C_5$ and higher carbon atom hydrocarbons, e) hydrocracking said condensate fraction of step d), the higher boiling fraction of step c) and the liquid fuel fraction of step a) with hydrogen under hydrocracking conditions in the presence of a catalyst comprising a hydrogenation component and an acid catalyst cracking component in a hydrocracker under hydrocracking conditions to produce a liquid reaction product mixture comprising a liquid fuel boiling fraction and a higher boiling fraction; and f) fractionating the liquid reaction product mixture of step e) into separate fractions comprising at least one liquid fuel boiling range fraction and at least one higher boiling fraction and recycling at least one higher boiling fraction back to said hydrocracker.

2. The process of claim 1 wherein said step b) is conducted at a temperature of about from 1000° F. (538° C.) to 1600° F. (871° C.) in the presence of about from 0.2 to 1 part by wt. of steam per part by wt. of said wax fraction.

3. The process of claim 1 wherein said catalyst of step e) contains at least one non-noble Group VIII metal and at least one Group VIB metal and an acid catalyst component.

4. The process according to claim 1 wherein said first hydrocarbon reaction product is contacted, prior to fractionating step a), with hydrogen under hydrotreating reactive conditions in the presence of a hydrotreating catalyst thereby converting oxygenates and olefins into paraffins.

5. A process for converting $C_1$–$C_3$ alkanes into liquid hydrocarbon products comprising $C_6$–$C_{24}$ normal alpha olefins and fuels which comprises the steps of:

a) reforming said $C_1$–$C_3$ alkanes into a syngas having a mole ratio of hydrogen to carbon monoxide of about 1 to 3 moles of hydrogen per mole of carbon moxoxide;

b) contacting the syngas product of step a) with a Fischer-Tropsch catalyst under Fischer-Tropsch reaction conditions to yield a first hydrocarbon reaction product boiling above about 540° F. comprising a major amount of $C_{16}$–$C_{50}$ linear paraffins and lesser amounts of oxygenates and higher boiling hydrocarbons and a second reaction product boiling below about 540° F. comprising tail gases, oxygenates and liquid fuel paraffins and oxygenates;

c) fractionating said first hydrocarbon reaction product of step b) into separate fractions comprising a fraction boiling in the liquid fuel boiling range, a wax fraction boiling in the range of about 540° F.–1100° F. comprising at least about 90 wt. % $C_{16}$–$C_{50}$ linear paraffins and a high boiling fraction boiling above about 1100° F.;

d) thermal cracking the wax fraction of step c) in the presence of steam at a mole ratio of steam to said wax fraction of about 3:1 to 5:1, under reactive conditions adjusted to provide a conversion no greater than about 30 wt. % of said was fraction thereby yielding a reaction product mixture containing $C_6$–$C_{24}$ alpha olefins of varying chain length and wherein the fraction of said reaction product boiling within the $C_6$ to $C_{24}$ normal alpha olefin boiling range contains at least 90 wt. % $C_6$ to $C_{24}$ normal alpha olefins;

e) fractionating the reaction product of step d) into separate fractions comprising at least one normal alpha olefin product fraction comprising a normal alpha olefin fraction selected within the range of 6 to 24 carbon atoms and having a normal alpha olefin purity of at least 90 wt. % and a higher boiling fraction comprising higher boiling olefins and paraffins;

f) hydrocracking said higher boiling fraction of step e) the liquid fuel fraction and the high boiling fraction of step c) and with hydrogen in the presence of a catalyst comprising a hydrogenation component and an acid catalyst cracking component under hydrocracking conditions to produce a liquid reaction product mixture comprising a liquid fuel boiling fraction and a higher boiling fraction; and g) fractionating the liquid reaction product mixture of step of) into separate fractions comprising at least one liquid fuel fraction and at least one higher boiling fraction.

6. The process of claim 5 wherein said second reaction product of step b) is separated into a tail gas fraction and a $C_5$ and higher carbon atom hydrocarbon fraction boiling below about 540° F. and hydrocracking said $C_5$ and higher carbon atom hydrocarbon fraction with hydrogen in the presence of a hydrocracking catalyst comprising a hydrogenation component and an acid cracking component under hydrocracking conditions.

7. The process of claim 5 wherein said step b) in conducted in a bubble slurry reactor.

8. The process of claim 5 wherein said step d) is conducted at a temperature of about from 650 to 1900° F. in the presence of about 0.2 to 1 part per weight of steam per part by weight of said wax fraction.

9. The process of claim 5 wherein said catalyst of step f) contains at least one non-noble Group VIII metal and at least one Group VIB metal and an acid catalyst component.

10. The process according to claim 5 wherein said first hydrocarbon reaction product is contacted, prior to fractionation step c), with hydrotreating reactive conditions in the presence of a hydrotreating catalyst thereby converting oxygenates and olefins into paraffins.

11. A process for upgrading a Fischer-Tropsch reaction product boiling above about 540° F. containing $C_{16}$ to $C_{50}$ linear paraffins, oxygenates, hydrocarbons boiling in the liquid fuel ranges and heavy boiling fraction hydrocarbons and wherein said reaction product contains at least 20 wt. % of $C_{16}$ to $C_{50}$ linear paraffins and less than 5 wt. % of said oxygenates, which process comprises the steps of:

a) fractionating said Fischer-Tropsch reaction product into separate fractions comprising a fraction boiling in the liquid fuel boiling range, a wax fraction boiling in about the range of 540° F. to 1100° F. comprising at least about 90 wt. % $C_{16}$ to $C_{50}$ linear paraffins and a high boiling fraction boiling above about 1100° F.

b) thermal cracking the was fraction of step a) in the presence of steam at a mole ratio of steam to said wax of at least 5:1, under reactive conditions adjusted to provide a conversion no greater than about 30 wt. % of said wax fraction thereby yielding a reaction product mixture containing normal alpha olefins of varying chain length within the range of $C_6$ to $C_{24}$, and wherein the fraction of said reaction product boiling within the C6 to $C_{24}$ normal alpha olefin boiling range contains at least 90 wt. % $C_6$ to $C_{24}$ normal alpha olefins;

c) fractionating the reaction product of step b) into separate fractions comprising at least one normal alpha olefin product fraction comprising normal alpha olefins selected within the range of 6 to 24 carbon atoms having purity of said normal alpha olefins of at least 90 wt. % and a higher boiling fraction comprising higher boiling olefins and paraffins;

d) hydrocracking said higher boiling fraction of step c), and the liquid fuel fraction of step a) with hydrogen in a hydrocracker in the presence of a catalyst comprising a hydrogenation component and an acid catalyst cracking component, under hydrocracking conditions to produce a liquid reaction product mixture comprising a liquid fuel boiling fraction; and e) fractionating the liquid reaction product mixture of step d) into separate fractions comprising a liquid fuel fraction, and at lest one higher boiling hydrocarbon fraction and recycling at least one of said higher boiling fraction back to said hydrocracker.

12. The process of claim 11 wherein said step b) is conducted at a temperature of about from 1000° F. (538° C.) to 1600° F. (871° C.) in the presence of about from 0.2 to 1 part by wt. of steam per part by wt. of said wax fraction.

13. The process of claim 11 wherein said catalyst of step d) contains at least one non-noble Group VIII metal and at least one Group VIB metal and an acid catalyst component.

14. The process according to claim 11 wherein said Fischer-Tropsch reaction product is contacted, prior to fractionating step a) with hydrogen under hydrotreating reactive conditions in the presence of a hydrotreating catalyst thereby converting oxygenates and olefins into paraffins.

15. A process for converting $C_1$–$C_3$ alkanes into liquid hydrocarbon products comprising normal alpha olefins and fuels which comprises the steps of:

a) reforming said $C_1$–$C_3$ alkanes into a syngas having a mole ratio of hydrogen to carbon monoxide of about 1 to 3 moles of hydrogen per mole of carbon moxoxide;

b) contacting the syngas product of step a) with a Fischer-Tropsch catalyst under Fischer-Tropsch reaction conditions to yield a first hydrocarbon reaction product boiling in about the range of 68° F. to 1300° F. comprising at least about 20 wt. % $C_{16}$ to $C_{50}$ linear paraffins, and lesser amounts of oxygenates;

c) fractionating the reaction product of step b) into separate fractions comprising a fraction boiling in the liquid hydrocarbon fuel range; a wax fraction boiling in about the range of 540° F. to 1100° F. comprising at least 90 wt. % $C_{16}$ to $C_{50}$ linear paraffins; and a high boiling hydrocarbon fraction boiling above 1100° F.; and d) thermal cracking the wax fraction of step c) in the presence of at least five moles of steam per mole of said wax fraction under reactive conditions adjusted to provide a conversion, based on said wax fraction no greater than 30 wt. % thereby yielding a reaction product mixture containing normal alpha olefins of vary chain length within the range of $C_6$ to $C_{24}$ and uncracked linear paraffins and wherein the fraction boiling within the boiling range of $C_6$ to $C_{24}$ normal alpha olefins contains at least 90 wt. % $C_6$ to $C_{24}$ normal alpha olefins;

e) fractionating the reaction product of step d) into separate fractions comprising at least one normal alpha olefin product fraction comprising normal alpha olefins selected within the range of 6 to 24 carbon atoms and a higher boiling fraction comprising higher boiling olefins and paraffins and wherein said normal alpha olefin fractions have a purity of at least about 90 wt. %;

f) hydrocracking the fuel fraction and higher boiling fractions of step c) and the higher boiling fraction of step e) by contacting said fraction with hydrogen in the presence of a catalyst comprising a hydrogenation component and an acid catalyst cracking component, under hydrocracking conditions to produce a liquid reaction product mixture comprising a fuel boiling fraction;

g) fractionating the liquid reaction product mixture of step f) into separate fractions comprising a liquid fuel boiling range fraction and at least one higher boiling hydrocarbon fraction.

16. The process of claim 15 wherein said step b) in conducted in a bubble slurry reactor.

17. The process of claim 15 wherein said step d) is conducted at a temperature of about from 650 to 1900° F. in the presence of about 0.2 to 1 part per weight of steam per part by weight of said wax fraction.

18. The process of claim 15 wherein said catalyst of step f) contains at least one non-noble Group VIII metal and at least one Group VIB metal and an acid catalyst component.

19. The process according to claim 15 wherein said liquid hydrocarbon reaction product of step (b) in contacted, prior to fractionating step c), with hydrogen under hydrotreating reactive conditions in the presence of a hydrotreating catalyst thereby converting oxygenates and olefins into paraffins.

* * * * *